(12) United States Patent
Bahr

(10) Patent No.: US 6,216,546 B1
(45) Date of Patent: Apr. 17, 2001

(54) SENSOR ARRANGEMENT FOR SPATIALLY AND TEMPORALLY VARYING MEASUREMENTS OF FORCE OR PRESSURE

(75) Inventor: Ulrich Bahr, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/332,714

(22) Filed: Jun. 14, 1999

(30) Foreign Application Priority Data

Jun. 13, 1998 (DE) .............................................. 198 26 484

(51) Int. Cl.⁷ ...................................................... G01D 7/00
(52) U.S. Cl. .................. 73/862.046; 73/862.041
(58) Field of Search ...................... 73/862.041, 862.042, 73/862.043, 862.044, 862.045, 862.046

(56) References Cited

U.S. PATENT DOCUMENTS

| | | | | |
|---|---|---|---|---|
| 4,555,954 | * | 12/1985 | Kim ................................. | 73/862.046 |
| 4,640,137 | * | 2/1987 | Trull et al. ....................... | 73/862.046 |
| 4,731,694 | | 3/1988 | Grabner et al. . | |
| 4,795,998 | | 1/1989 | Dunbar et al. ........................... | 338/5 |
| 4,839,512 | * | 6/1989 | Speck ................................ | 250/231.1 |
| 4,901,584 | * | 2/1990 | Brunner et al. ................ | 73/862.046 |
| 5,060,527 | * | 10/1991 | Burgess ............................. | 73/862.68 |
| 5,429,006 | * | 7/1995 | Tamori ............................ | 73/862.046 |

FOREIGN PATENT DOCUMENTS

| | | |
|---|---|---|
| 3011266 | 10/1981 | (DE) . |
| 3642780 | 11/1987 | (DE) . |
| 4237072 | 12/1993 | (DE) . |
| 196 25 730 | 1/1998 | (DE) . |
| 197 52 976 | 6/1998 | (DE) . |
| 195 10 617 | 9/1998 | (DE) . |
| 2115556 | 9/1983 | (GB) . |

* cited by examiner

*Primary Examiner*—Max Noori
(74) *Attorney, Agent, or Firm*—Baker Botts L.L.P.

(57) ABSTRACT

A sensor arrangement for spatially or temporally varying measurements of force or pressure includes a support fabric in which conductive column fibers and a line fibers are integrated and the material of the conductive fibers is chosen so that a contact resistance at a contact point between a column fiber and a line fiber is dependent on the force or pressure applied to the contact point. An electronics evaluation unit receives signals from the conductive fibers to measure the applied force or pressure.

8 Claims, 1 Drawing Sheet

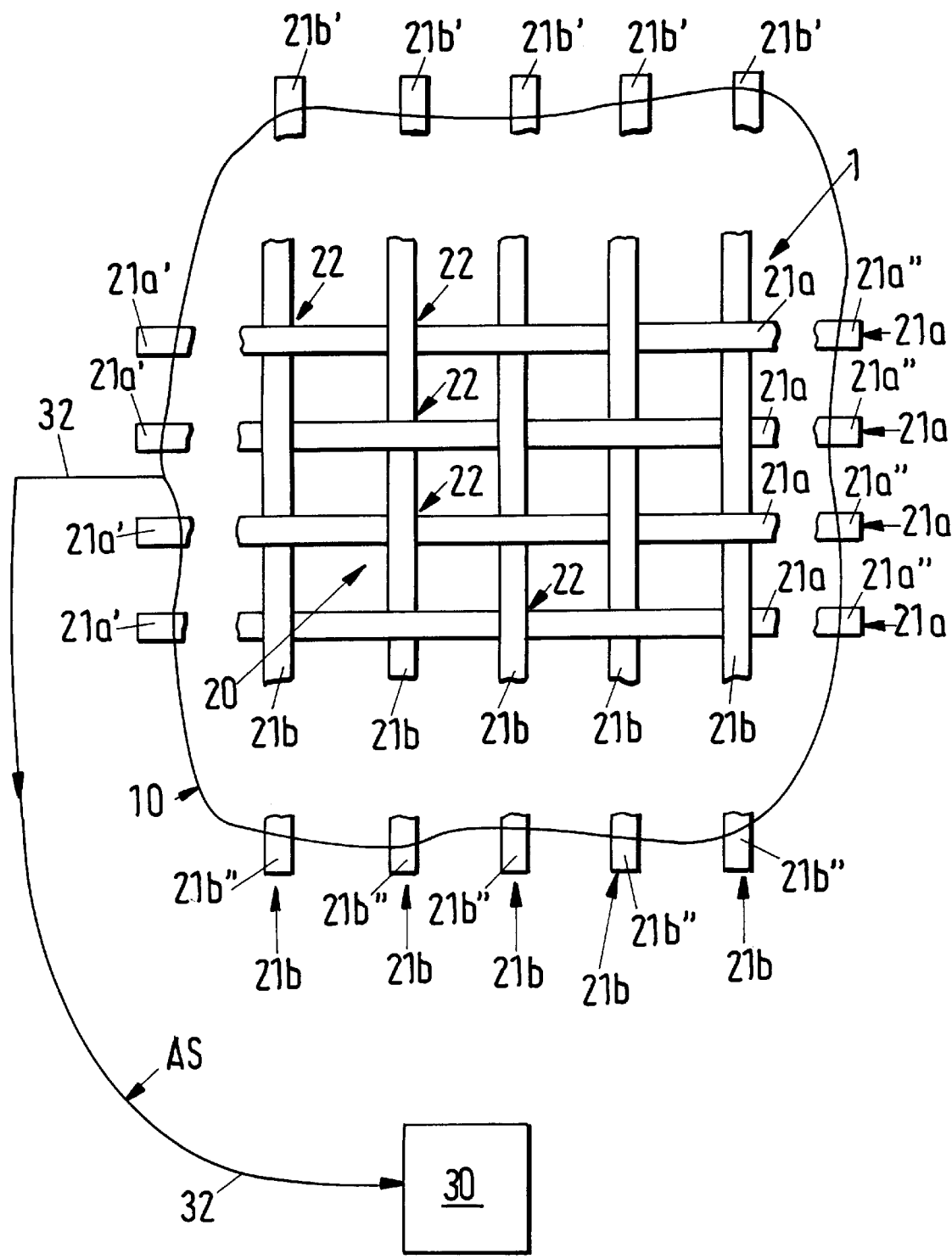

SENSOR ARRANGEMENT FOR SPATIALLY AND TEMPORALLY VARYING MEASUREMENTS OF FORCE OR PRESSURE

BACKGROUND OF THE INVENTION

This invention relates to sensor arrangements for spatially and temporally varying measurements of force or pressure in which a support material has column and line conductor paths capable of being supplied with voltages.

Sensor arrangements having a support material which is a plastic film on which the column and line conductor paths are applied by screen printing are known. Between the conductor paths of these arrangements, a conductive link is provided which has a resistance that varies in response to application of compressive forces. One disadvantage of such conventional sensor arrangements is that they have a low bending and bulging flexibility and are especially susceptible to interference caused by crinkling of the support material. Another disadvantage of the conventional pressure sensing films is that they must be applied to the surface of an object to which the pressure or force which is to be measured is applied. Therefore the sensor arrangement alters structural and/or functional properties of the surface of specimen, for example the frictional behavior of the surface, in a detrimental manner. This is especially disadvantageous in safety experiments using anthropomorphic test figures ("dummies") in the automotive field.

SUMMARY OF THE INVENTION

Accordingly, it is an object of the present invention to provide a sensor arrangement for spatially and temporally varying measurements of force or pressure which overcomes disadvantageous of the prior art.

Another object of the invention is to provide a sensor arrangement of the foregoing type which is less sensitive to interferences.

These and other objects of the invention are attained by providing a sensor arrangement having a support material which is a support fabric and column and line conductor paths which are conductive column and line fibers, respectively, and are integrated into the support fabric, in which the material of the conductive fibers is chosen to produce a contact resistance at a point of contact between a line fiber and a column fiber that is dependent on the compressive loading at the point of contact.

With this sensor arrangement, crinkling of the support material does not produce any interfering influence on the output signals from the sensor since the conductive fibers are movable, which reduces shearing stresses.

Another advantage of the sensor arrangement according to the invention is that it has a fabric-like and hence flexible structure. This provides a greater bending and bulging flexibility in an advantageous manner compared to conventional plastic sensor films so that the sensor arrangement according to the invention is especially suitable for use with test surfaces of any shape or test surfaces that will deform during the measurement.

A further advantage of the invention is that the sensor arrangement can be integrated with especial ease in existing fabrics, for example, in the fabric of an airbag or the fabric of a seat in a motor vehicle, so that a simple and economical process of production and increased mechanical sturdiness are provided compared to conventional plastic test films. This integration of the conductive fibers into the fabric has the further advantage that the sensor arrangement has little or no effect on the structural and/or functional surface properties of the test specimen.

In an advantageous refinement of the invention the conductive fibers are elastic fibers, in particular carbon fibers or semiconductive polymer fibers. This has the advantage that the elastic fibers will to a large extent adapt themselves to the form of their support fabric, even in a bowed or curved condition.

BRIEF DESCRIPTION OF THE DRAWING

Further objects and advantages of the invention will be apparent from a reading of the following description in conjunction with the accompanying single drawing FIGURE which is a schematic fragmentary view illustrating a representative embodiment of a sensor arrangement according to the invention.

DESCRIPTION OF PREFERRED EMBODIMENT

The typical sensor arrangement 1 shown in the drawing includes a matrix-like grid 20 of conductive line fibers 21$a$ and column fibers 21$b$ having a plurality of contact points 22, the line fibers 21$a$ and the column fibers 21$b$ being arranged one above the other at each contact point 22. The line fibers 21$a$ and the column fibers 21$b$ are woven into a support fabric 10, which is shown only schematically in the drawing, and are connected at their ends 21$a$' and 21$a$" and 21$b$' and 21$b$" to an evaluating electronics unit 30 by way of electrical connecting lines 32. The material of the fibers 21$a$ and 21$b$ is chosen so that the contact resistance between a line fiber 21$a$ and a column fiber 21$b$ at each contact point 22 is dependent on the force or pressure applied at the contact point 22. Preferably, elastic fibers are used, in particular conductive carbon fibers or semiconductive polymer fibers. Furthermore, it is preferred that the cross-sectional shape of the fibers 21$a$ and 21$b$ is in the form of strips, circles, diamonds or rhombi.

It will be apparent to one skilled in the art from the foregoing that the pitch of the grid 20 formed by the line fibers 21$a$ and the column fibers 21$b$ is to be selected substantially according to the desired spatial resolution of the measurements to be attained. It will also be apparent that the support fabric 10 must be adapted to the intended purpose with respect to its strength and rigidity.

If the intended use of the sensor arrangement 1 is in an airbag or an auto seat, for example, it is preferred that the conductive fibers 21$a$ and 21$b$ of the sensor 1 are woven into the fabric of the airbag or seat, so that this fabric layer forms the support fabric 10.

Since, as described above, the fibers 21$a$ and 21$b$ are arranged so that, upon a variation of pressure applied at a contact point 22, the contact resistance will vary, the output signal AS of the stressed fibers 21$a$ and 21$b$ will vary as well, so that the evaluating electronics unit 30 can determine from the signal the pressure loading prevailing at each particular contact point 22.

Preferably, the sensor arrangement also includes a pre-evaluation unit between the evaluating electronics 30 and the sensor 1 for detecting the output signals AS of the line fibers 21$a$ and column fibers 21$b$ and correlating them with the particular point of contact 22 in a multiplex-fashion. This has the advantage of reducing the required number of connecting lines 32 leading to the evaluating electronics unit 30 and/or of the number of signals carried to the evaluating electronics unit 30, because sensor signals which are irrelevant to the actual measurements are suppressed beforehand by the pre-evaluation unit.

Summarizing, it will be noted that the sensor arrangement 1 is distinguished not only by its simple and therefore economical construction, but also because the sensor can be integrated in simple manner into an already existing fabric. Furthermore, it has a high flexibility in bending and bulging, so that it is especially well suited to use with bulging test surfaces or test surfaces that are deformed during the measurement.

Although the invention has been described herein with reference to specific embodiments, many modifications and variations therein will readily occur to those skilled in the art. Accordingly, all such variations and modifications are included within the intended scope of the invention.

I claim:

1. An airbag sensor arrangement for temporally and spatially varying measurement of force or pressure comprising an airbag having a support fabric containing a sensor which includes a plurality of column and line conductor fibers integrated in the support fabric and capable of being supplied with voltage, wherein the material of the conductive fibers is chosen so that a contact resistance at a contact point between a column fiber and a line fiber is dependent on the force or pressure applied to the contact point, thereby measuring force or pressure without requiring a separate sensing element at each contact point.

2. An airbag sensor arrangement according to claim 1 wherein the material used for at least one of the column fibers or the line fibers is an elastic fiber.

3. An airbag sensor arrangement according to claim 2 where the elastic fiber is selected from the group consisting of carbon fibers and semiconductive polymer fibers.

4. An airbag sensor arrangement according to claim 1 wherein the column fibers and the line fibers form a grid.

5. An airbag sensor arrangement according to claim 1 including an evaluating electronics unit and wherein the column fibers and line fibers have ends which are connectable to the evaluating electronics unit by way of at least one connecting line.

6. An airbag sensor arrangement according to claim 1 wherein at least one of the fibers has a cross-sectional configuration which is selected from the group consisting of a strip, a circle, a diamond and a rhombus.

7. An airbag sensor arrangement according to claim 5 wherein the evaluating electronics unit detects a signal variation of an output signal from the sensor and determines the magnitude of a pressure or force loading at least one contact point therefrom.

8. An airbag sensor arrangement according to claim 5 including a pre-evaluation unit between the sensor and the evaluating electronics unit.

* * * * *